May 13, 1969  E. SIEGWART  3,443,601

SHEET METAL JOINT

Filed June 7, 1967  Sheet _1_ of 2

Inventor:
Emil Siegwart

May 13, 1969  E. SIEGWART  3,443,601

SHEET METAL JOINT

Filed June 7, 1967  Sheet 2 of 2

Inventor:
Emil Siegwart

United States Patent Office 3,443,601
Patented May 13, 1969

3,443,601
SHEET METAL JOINT
Emil Siegwart, Michael-Blatter-Strasse 6,
Sulzbach-Neuweiler, Saar, Germany
Filed June 7, 1967, Ser. No. 644,281
Claims priority, application Germany, Mar. 23, 1967,
S 109,010
Int. Cl. B65d 7/34, 7/42
U.S. Cl. 138—156          8 Claims

ABSTRACT OF THE DISCLOSURE

Means for joining marginal portions of adjacent portions of sheet metal members, including bends in the marginal portions and a generally hollow member surrounding such bent portions and slidably engaging same in a manner to press selected areas thereof towards one another.

---

The present invention relates to a sheet metal joint for connecting sheet metal elements colliding on their front ends as used e.g. for ventilation conduits.

Colliding sheet metal elements were hitherto joined to each other with soldering or welding techniques or by the use of rivets or belts. Such joints were either insoluble or did not guarantee a satisfactory sealing.

It is the object of the present invention to provide a new and useful improvement of a sheet metal joint which vouches for a satisfactory sealing with simple means and, in addition, can be constructed as well as dismounted in a very easy way.

A further object of the present invention is the provision of sheet metal conduits which can consist of various components by using the sheet metal joint according to the present invention.

In the following, the invention will be described with more details, whereby reference is taken to certain embodiments shown in the drawings in which.

Figure 1:
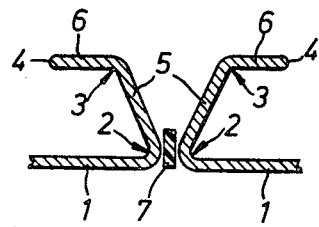
FIG. 1 shows a cross section through the dressing of the edges of sheet metal components before the joint is established.

In FIG. 1, the reference symbol 1 indicates two sheet metal elements which are to be joined according to the present invention. The edges of the sheet elements 1 are bent over in a similar manner along lines at 2 and 3 parallel to the adjacent hem 4 in such a way that the edge portions 5 lying between the two bendings 2 and 3 form an acute angle with the main section of the corresponding sheet metal element 1, while the edge portions 6 lying outside of the exterior bending 3 run again parallel to the main section of the corresponding sheet metal element 1. In certain cases, a sealing inlay 7 preferably made of an elastic material, is provided between the edges formed by the inner bendings 2, as shown.

Figure 2:
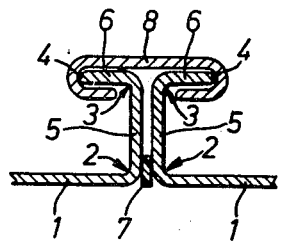
FIG. 2 shows a cross section through the finished joint.

FIG. 2 shows how the edges of the colliding sheet metal elements 1 formed according to FIG. 1 are partially surrounded by a hollow ledge 8, which forces the edge portions 6 against each other, so that the inner bendings 2 are pressed toward each other under tension, squeezing the sealing inlay 7. Preferably, the edge portions 5 lying between the two bendings are then oriented parallel to each other.

It is understandable that the tension caused by this arrangement guarantees a firm joint even when lateral or transversal forces appear, having the tendency to pull apart the two inner bendings 2.

The hollow ledge 8 which can be pulled off and placed on at any time has a C-shaped cross section and surrounds the outer edge portions 6 of the sheet metal element 1 whereby pressure forces appear, especially on the hems 4. The free arms of the C-shaped profile of the hollow ledge 8 lie close to the exterior bending 3.

Figure 3:
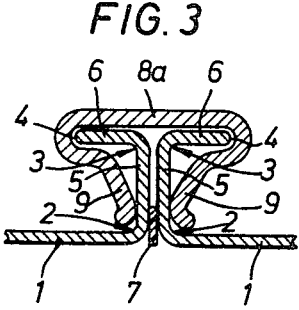
FIG. 3 is a cross sectional view of another embodiment of a joint according to the present invention.

FIG. 3 shows another embodiment of the hollow ledge which—for reasons of differentiation—is indicated with the reference symbol 8a. The construction of the other components of the sheet metal joint is identical to the corresponding part in FIG. 2 so that the same reference symbols are used.

If the material of the sheet metal element 1 shows only little spring action qualities or if the same is particularly thin, then, especially the embodiment of FIG. 3 can be applied with certain advantage. That is to say, in order to obtain a continuous firm sealing in the area of the inner bendings 2, it might not be enough to form the edges of the sheet metal elements 1 according to FIG. 1. The hollow ledge 8a by itself is formed out of an elastic material which, under certain circumstances, can have a greater thickness than the sheet metal elements 1. The hollow ledge 8a is different from the hollow ledge 8 in FIG. 2 in that the arms 9 of the profile are lengthened and bent outwards so that the inside of the hollow ledge 8a has a T-shaped across section. Preferably, the arms 9 extend under a certain angle towards each other as shown, so that they touch only certain sections close to the inner bendings 2 of the edge portions 5; in such a way, the pressure force is only applied to those portions of the sheet metal element 1 at which pressure is needed, i.e. in the area of the sealing inlay 7.

Figure 4:
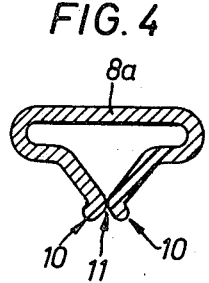
FIG. 4 shows the fastening ridge for the embodiment according to FIG. 3 prior to the assembly.

Preferably, the arms 9 are under initial stress so that prior to the assembly they touch each other close to their ridge 10, as shown in FIG. 4. A certain spreading apart of the ridges 10 away from the line of contact 11 facilitates the slipping on the hollow ledge 8a.

Under certain circumstances, the usage of a hollow ledge according to FIG. 4 makes it unnecessary to form the edges of the sheet metal element 1 according to FIG. 1. In this case, the edges can be formed by bending twice around an angle of 90°. The clamping effect is then produced only by the elasticity of the hollow ledge 8a.

It shall be understood that whenever an absolutely tight joint connection is not required, the sealing inlay 7 can be omitted.

Figure 5:
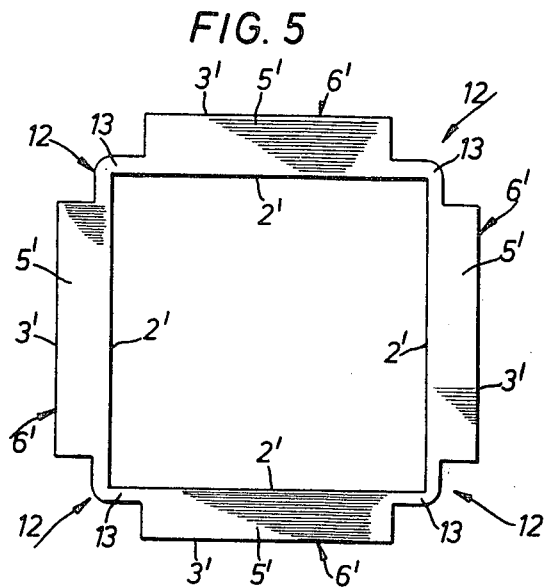
FIG. 5 is a front view on a conduit section which can be joined with other similar conduit sections by using joints according to the present invention.

FIG. 5 shows a front view of a conduit section with a quadratic cross section, formed out of sheet metal to be used e.g. as a ventilation conduit. The relatively large edge portions 5' to be seen in this figure correspond to the edge portions 5 according to FIGS. 1 to 3. Adjoining rand portions 6' corresponding to the rand portions 6 of FIGS. 1 to 3 have to be thought of as perpendicular to the drawing plane. The inner bendings 2' correspond to the inner bending 2 of the previous figures, while the exterior bendings 3' corresponding to the exterior bendings 3.

It is easy to understand that various conduit sections as shown in FIG. 5 can be joined to each other similar to the joining of the sheet metal elements 1 already discussed, by using four hollow ledges each according to FIG. 2 or 4. In order to be able to slide on the ledges 8, cut outs 12 are arranged in the corners of the sheet metal conduit, whereby only a relatively narrow strap 13 remains, which is formed by bending once the conduit walls. This narrow strap represents a continuation of the edge portions 5' and serves for reinforcement of the sheet metal conduit.

Figure 6:
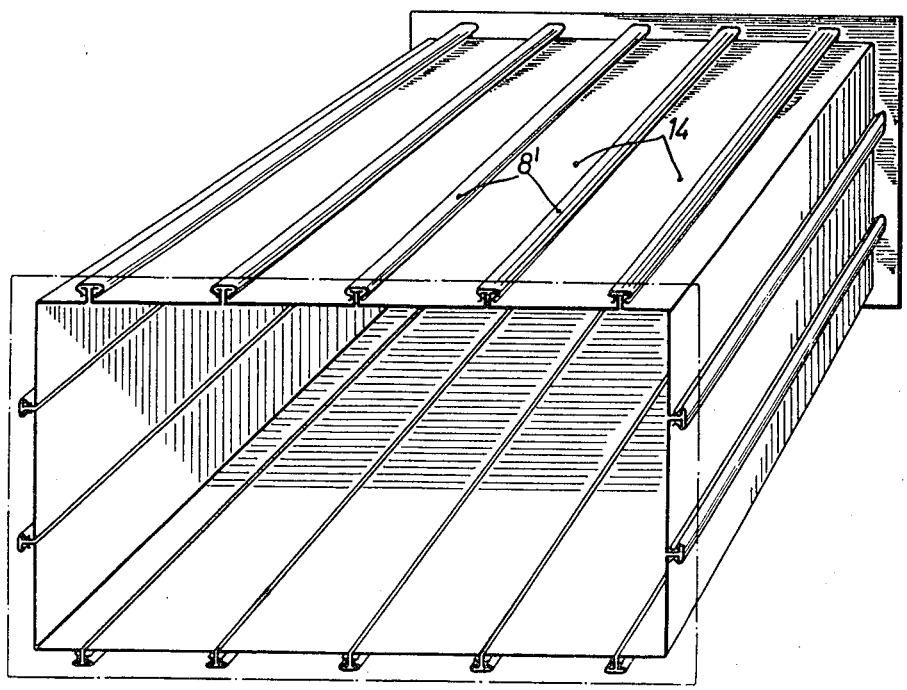
FIG. 6 shows a conduit section which, with the use of joints according to the present invention, is composed of various sheet metal components, especially when bigger cross sections are required.

FIG. 6 shows another embodiment of a conduit section to be used especially for bigger cross sections. On the front side, such a conduit section can be joined with other conduit sections of the same type similar to the one as shown in FIG. 5. The front side edge, i.e. the flange is indicated in this case only schematic. As the main feature, the conduit section according to FIG. 6 is composed of various sheet metal components 14, which are joined to each other, according to this invention, with hollow ledges 8' to be placed in the longitudinal direction of the conduit. The hollow ledges 8' can be formed according to FIG. 2 or 4. They permit not only that the conduit can be assembled out of easy storable and transportable sheet metal elements at its final location but that, in addition, a remarkable stiffening of the large area conduit walls is obtained, whereby undesirable vibrations and rumbling noises can be suppressed. Such vibrations are very disagreeable because they propagate inside the conduit and are not easy to dampen out because of their low frequency. With the shown application of the joint according to this invention, practically all vibrations can be suppressed.

As a matter of course, the present invention shall not be restricted to the shown embodiments. It should be noted in particular that the sheet metal joint according to the invention can not only be applied for sheet metal conduits but also for joining and sealing sheet elements e.g. on sheet metal roofs and the like. The extent of the invention shall be determined by the following claims.

What I claim is:

1. A joint of the class described for securing adjacent sheet metal elements comprising: a first bend along opposed zones of the adjacent elements forming opposed marginal regions tending to define with one another an outwardly diverging angle, a second bend along the outer edges of each marginal region forming oppositely directed outer edge portions parallel to the main portion of their respective sheet metal element, and a slidable hollow ledge surrounding the outer edge portions and drawing same towards one another against the force of the aforementioned tendency whereby said marginal regions are pressed together in the vicinity of the first bends.

2. Sheet metal joint according to claim 1, characterised in that a sealing inlay is positioned between the edge portions of both sheet metal elements between both bendings.

3. Sheet metal joint according to claim 1, characterised in that the hollow ledge has a C-shaped profile surrounding only the outer edge portions of the sheet metal elements.

4. Sheet metal joint according to claim 1, characterised in that the inside of the hollow ledge has, principally, a T-shaped profile, the free arms of the profile extending toward each other at their ends whereby the sheet metal portions lying between both bendings touch each other under pressure.

5. A joint of the class described for securing adjacent sheet metal elements comprising: a first bend along opposed zones of the adjacent elements forming opposed marginal regions tending to define with one another an outwardly diverging angle, a second bend along the outer edges of each marginal region forming oppositely directed outer edge portions parallel to the main portion of their respective sheet metal element, and a slidable hollow ledge with an essentially T-shaped cross-section surrounding the outer edge portions and marginal portions, the free ends of the arms of said T-shaped ledges bearing against the outer surfaces of the marginal portions near said first bends, said ledges drawing said outer edge portions and marginal portions towards one another against the force of the aforementioned tendency whereby said marginal regions are elastically pressed together in the vicinity of the first bends.

6. Sheet metal joint according to claim 5, characterised in that a sealing inlay is positioned between the edge portions lying between both bendings.

7. A sheet metal conduit of the class described comprising, adjacent conduit sections, a first bend along opposed zones of the adjacent conduit sections forming opposed marginal regions tending to define with one another an outwardly diverging angle, a second bend along the outer edges of each marginal region forming oppositely directed outer edge portions parallel to the main portion of their respective sheet metal element, and a slidable hollow ledge surrounding the outer edge portions and drawing same towards one another against the force of the aforementioned tendency whereby said marginal regions are pressed together in the vicinity of the first bends.

8. A conduit according to claim 7 further characterised in that said sections are formed of components joined as set forth with the opposed zones of such components, bends and ledges extending in a direction parallel to the longitudinal axis of the respective conduit sections.

References Cited

UNITED STATES PATENTS

| | | | |
|---|---|---|---|
| 604,394 | 5/1898 | Hunter | 138—156 |
| 625,946 | 5/1899 | Wilmot | 138—165 |
| 1,693,428 | 11/1928 | Atteberry et al. | 138—165 |
| 2,575,069 | 11/1951 | Rankin et al. | 220—80 |
| 3,193,129 | 7/1965 | Pfluger et al. | 220—80 |
| 3,294,276 | 12/1966 | Kemp et al. | 220—80 |

HENRY S. JAUDON, *Primary Examiner.*

U.S. Cl. X.R.,

220—80